US012713424B2

(12) United States Patent
Callard et al.

(10) Patent No.: US 12,713,424 B2
(45) Date of Patent: Aug. 18, 2026

(54) APPLICATION LAYER PREEMPTIVE SCHEDULING REQUESTS FOR ULTRA-LOW LATENCY

(71) Applicant: Telefonaktiebolaget LM Ericsson (publ), Stockholm (SE)

(72) Inventors: Aaron Callard, Kanata (CA); Hatem Abou-zeid, Calgary (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 400 days.

(21) Appl. No.: 18/253,490

(22) PCT Filed: Nov. 12, 2021

(86) PCT No.: PCT/IB2021/060512

§ 371 (c)(1),
(2) Date: May 18, 2023

(87) PCT Pub. No.: WO2022/106972

PCT Pub. Date: May 27, 2022

(65) Prior Publication Data

US 2024/0015735 A1 Jan. 11, 2024

Related U.S. Application Data

(60) Provisional application No. 63/116,458, filed on Nov. 20, 2020.

(51) Int. Cl.
*H04W 28/02* (2009.01)
*H04W 72/1268* (2023.01)

(52) U.S. Cl.
CPC ... *H04W 72/1268* (2013.01); *H04W 28/0278* (2013.01)

(58) Field of Classification Search
CPC ............... H04W 56/005; H04W 56/00; H04W 72/1268; H04W 74/0833; H04W 74/0841;
(Continued)

(56) References Cited

U.S. PATENT DOCUMENTS

| | | | | |
|---|---|---|---|---|
| 8,837,403 B2 * | 9/2014 | Stattin | H04W 72/21 | 370/329 |
| 11,737,105 B2 * | 8/2023 | Luo | H04L 5/0087 | 370/329 |

(Continued)

FOREIGN PATENT DOCUMENTS

| | | |
|---|---|---|
| CN | 111148147 A | 5/2020 |
| EP | 3439410 A1 | 2/2019 |
| EP | 3570617 A1 | 11/2019 |

OTHER PUBLICATIONS

International Search Report and Written Opinion dated Feb. 23, 2022 issued in PCT Application No. PCT/IB2021/060512 filed Nov. 12, 2021, consisting of 12 pages.

*Primary Examiner* — Nathan S Taylor
(74) *Attorney, Agent, or Firm* — Weisberg I.P. Law, P.A.

(57) ABSTRACT

Methods, systems and apparatuses are disclosed for configuring application layer preemptive scheduling requests for ultra-low latency. A wireless device (WD) configured to communicate with a network node is described. The WD comprises processing circuitry and a radio interface in communication with the processing circuitry. The processing circuitry is configured to determine indication data associated with a future transmission. The radio interface is configured to transmit a scheduling request, SR, on a periodic SR opportunity based at least on the received indication data.

18 Claims, 13 Drawing Sheets

(58) Field of Classification Search
CPC . H04W 74/0866; H04W 74/08; H04W 72/12; H04W 60/00; H04W 76/18; H04W 68/005; H04W 8/24; H04W 84/042; H04W 92/24; H04W 68/00; G01S 13/003; G01S 13/765; G01S 13/767; G01S 13/87; G01S 13/00; G01S 13/76; G01S 5/02; H04L 43/0864
USPC .......................................................... 370/329
See application file for complete search history.

(56) References Cited

U.S. PATENT DOCUMENTS

2013/0182623 A1* 7/2013 Fan ....................... H04W 72/21
370/329
2019/0110224 A1* 4/2019 Yasukawa ............. H04W 72/21
2019/0327757 A1* 10/2019 Oteri ..................... H04L 5/0053
2019/0357247 A1* 11/2019 Keskitalo .............. H04W 72/21
2020/0281012 A1* 9/2020 Behravan .......... H04W 72/1268
2021/0345302 A1* 11/2021 Wong .................... H04W 72/04
2022/0109486 A1* 4/2022 Fu ......................... H04L 5/0044
2022/0264338 A1* 8/2022 Park ...................... H04W 92/18
2023/0106128 A1* 4/2023 Lee ..................... H04W 72/569
370/329
2023/0209556 A1* 6/2023 Kang .................... H04L 5/0048
370/329
2023/0217304 A1* 7/2023 Singh .................... H04W 72/21
370/329
2023/0262508 A1* 8/2023 Liu ....................... H04W 40/22
370/252
2023/0309161 A1* 9/2023 Rao ....................... H04L 5/0048
2023/0319946 A1* 10/2023 Wang ................ H04W 52/0235
370/329
2024/0073854 A1* 2/2024 Rao ....................... G01S 5/0036

* cited by examiner

APPLICATION LAYER PREEMPTIVE SCHEDULING REQUESTS FOR ULTRA-LOW LATENCY

CROSS-REFERENCE TO RELATED APPLICATIONS

This application is a Submission Under 35 U.S.C. § 371 for U.S. National Stage Patent Application of International Application No.: PCT/IB2021/060512, filed Nov. 12, 2021 entitled "APPLICATION LAYER PREEMPTIVE SCHEDULING REQUESTS FOR ULTRA-LOW LATENCY," which claims priority to U.S. Provisional Application No. 63/116,458, filed Nov. 20, 2020, entitled "APPLICATION LAYER PREEMPTIVE SCHEDULING REQUESTS FOR ULTRA-LOW LATENCY," the entireties of both of which are incorporated herein by reference.

TECHNICAL FIELD

The present disclosure relates to wireless communications, and in particular, to application layer preemptive scheduling requests (SRs) for ultra-low latency communications.

BACKGROUND

Communication networks, such as those provided based on standards promulgated by the 3rd Generation Partnership Project (3GPP), e.g., Long Term Evolution (LTE) and New Radio (NR) (NR is also referred to as 5G), generally benefit from packet transmissions with very low delay. In particular, some use cases, such as Extended Reality (XR), Virtual reality (VR), Augmented Reality (AR) use cases, require very low delay in packet transmissions, e.g., uplink (UL) transmissions and downlink (DL) transmissions. Difficulties associated with achieving low latency in UL traffic includes enabling a scheduler in a network node, e.g., Evolved Node B (eNb), Generation Node B (gNB), to be aware of a wireless device (WD) having data, e.g., data of the correct type, in a WD buffer, and the data is ready to be sent.

Uplink Scheduling Background

FIG. 1 illustrates a flow chart of an example process utilizing a standard technique for UL scheduling. A WD application (WD App) generates UL data which triggers a Physical Uplink Control Channel (PUCCH) at the next opportunity, i.e., SR sent on periodic SR opportunity. A UL grant, such as via Physical Downlink Control Channel (PDCCH), is provided by a network node, such as a network node in a Radio Access Network (RAN), which triggers an uplink transmission from the WD that encodes a Buffer Status Report (BSR). The BSR informs the network node, e.g., gNB, if there is more data and how much data is available, which is then served in follow-up grants. This standard technique for UL scheduling leads to multiple round trips that significantly add to communication delays, including delays experienced by end users of the communication network.

In other words, standard techniques do not provide mechanisms that proactively send a UL grant from a network node, e.g., in a RAN, to a WD at the right time, i.e., neither too early, nor too late.

SUMMARY

Proactively sending UL grants from the network node, e.g., in a RAN, may be particularly beneficial for Time Division Duplex (TDD) systems, where UL slots are infrequent and beneficial for upcoming low latency applications, such as AR and industrial control. Some embodiments advantageously provide methods, systems, and apparatuses for application layer preemptive scheduling requests (SRs) for ultra-low latency.

According to one aspect of the present disclosure, a wireless device (WD) configured to communicate with a network node is described. The WD comprises processing circuitry and a radio interface in communication with the processing circuitry. The processing circuitry is configured to determine indication data associated with a future transmission. The radio interface is configured to transmit a scheduling request, SR, on a periodic SR opportunity based at least on the received indication data.

In some embodiments, the indication data associated with the future transmission is associated with a packet ping at a predetermined time based on a time offset, where the time offset is determined based on the future transmission.

In some other embodiments, the indication data associated with the future transmission is associated with a trigger message transmitted to a chipset of the WD, where the trigger message indicates a time that a packet will be generated.

In an embodiment, the indication data associated with the future transmission is associated with an indication to the WD that a predetermined amount of data at a predetermined time will be available for transmission, where the indication to the WD is one of a periodic indication and a non-periodic indication.

In another embodiment, a first uplink (UL) grant based at least on the SR on the periodic SR opportunity is received and at least a first UL packet and a first buffer status report (BSR) are transmitted in response to receiving the first UL grant.

In some embodiments, the BSR includes at least one of future data and non-causal data, where the non-causal data is transmittable one of within the WD and to the network node.

In some other embodiments, generated UL data is determined for a transmission of at least one UL packet associated with the generated UL data, where the generated UL data is generated by a WD application.

In an embodiment, a second UL grant is received, at least the second UL packet and a second BSR are transmitted.

In another embodiment, at least the second UL packet and the second buffer status report, BSR, are transmitted in response at least to receiving at least any one of the second UL grant from the network node and generated UL data from a WD application.

In some embodiments, traffic associated with the future transmission is predicted based in part on input received from the WD application.

According to another aspect, a method implemented in a WD configured to communicate with a network node is described. The method includes determining indication data associated with a future transmission and transmitting a scheduling request, SR, on a periodic SR opportunity based at least on the received indication data.

In some embodiments, the indication data associated with the future transmission is associated with a packet ping at a predetermined time based on a time offset, where the time offset is determined based on the future transmission.

In some other embodiments, the indication data associated with the future transmission is associated with a trigger message transmitted to a chipset of the WD, where the trigger message indicates a time that a packet will be generated.

In an embodiment, the indication data associated with the future transmission is associated with an indication to the WD that a predetermined amount of data at a predetermined time will be available for transmission, where the indication to the WD is one of a periodic indication and a non-periodic indication.

In another embodiment, a first uplink (UL) grant based at least on the SR on the periodic SR opportunity is received and at least a first UL packet and a first buffer status report (BSR) are transmitted in response to receiving the first UL grant.

In some embodiments, the BSR includes at least one of future data and non-causal data, where the non-causal data is transmittable one of within the WD and to the network node.

In some other embodiments, generated UL data is determined for a transmission of at least one UL packet associated with the generated UL data, where the generated UL data is generated by a WD application.

In an embodiment, a second UL grant is received, at least the second UL packet and a second BSR are transmitted.

In another embodiment, at least the second UL packet and the second buffer status report, BSR, are transmitted in response at least to receiving at least any one of the second UL grant from the network node and generated UL data from a WD application.

In some embodiments, traffic associated with the future transmission is predicted based in part on input received from the WD application.

According to another aspect, a network node configured to communicate with a WD is described. The network node includes processing circuitry and a radio interface in communication with the processing circuitry. The radio interface is configured to receive an SR, on a periodic SR opportunity based at least on indication data associated with a future transmission. The processing circuitry is configured to determine at least one UL grant for the WD based at least in part on the received SR.

In some embodiments, the indication data associated with the future transmission is associated with a packet ping associated with the WD at a predetermined time based on a time offset, the time offset being determined based on the future transmission.

In some other embodiments, the indication data associated with the future transmission is associated with a trigger message transmitted to a chipset of the WD, where the trigger message indicates a time that a packet will be generated.

In an embodiment, the indication data associated with the future transmission is associated with an indication to the WD that a predetermined amount of data at a predetermined time will be available for transmission, where the indication to the WD is one of a periodic indication and a non-periodic indication.

In another embodiment, a first UL grant is transmitted based at least on the SR on the periodic SR opportunity; and at least a first UL packet and a first buffer status report, BSR, is received in response to the first UL grant.

In some embodiments, the BSR includes at least one of future data and non-causal data.

In some other embodiments, a second UL grant is transmitted, and at least the second UL packet and a second BSR is received.

In an embodiment, at least the second UL packet and the second BSR are received in response at least to at least any one of the second UL grant from the network node and generated UL data from a WD application.

In another embodiment, the generated UL data from a WD application is based at least in part on predicted traffic associated with the future transmission.

In some embodiments, a message is transmitted to the WD, where the message triggers a chipset of the WD to provide a time offset at which generated UL data will be available.

According to another aspect, a method implemented in a network node configured to communicate with a WD is described. The method includes receiving an SR on a periodic SR opportunity based at least on indication data associated with a future transmission and determining at least one UL grant for the WD based at least in part on the received SR.

In some embodiments, the indication data associated with the future transmission is associated with a packet ping associated with the WD at a predetermined time based on a time offset, the time offset being determined based on the future transmission.

In some other embodiments, the indication data associated with the future transmission is associated with a trigger message transmitted to a chipset of the WD, where the trigger message indicates a time that a packet will be generated.

In an embodiment, the indication data associated with the future transmission is associated with an indication to the WD that a predetermined amount of data at a predetermined time will be available for transmission, where the indication to the WD is one of a periodic indication and a non-periodic indication.

In another embodiment, a first UL grant is transmitted based at least on the SR on the periodic SR opportunity; and at least a first UL packet and a first buffer status report, BSR, is received in response to the first UL grant.

In some embodiments, the BSR includes at least one of future data and non-causal data.

In some other embodiments, a second UL grant is transmitted, and at least the second UL packet and a second BSR is received.

In an embodiment, at least the second UL packet and the second BSR are received in response at least to at least any one of the second UL grant from the network node and generated UL data from a WD application.

In another embodiment, the generated UL data from a WD application is based at least in part on predicted traffic associated with the future transmission.

In some embodiments, a message is transmitted to the WD, where the message triggers a chipset of the WD to provide a time offset at which generated UL data will be available.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
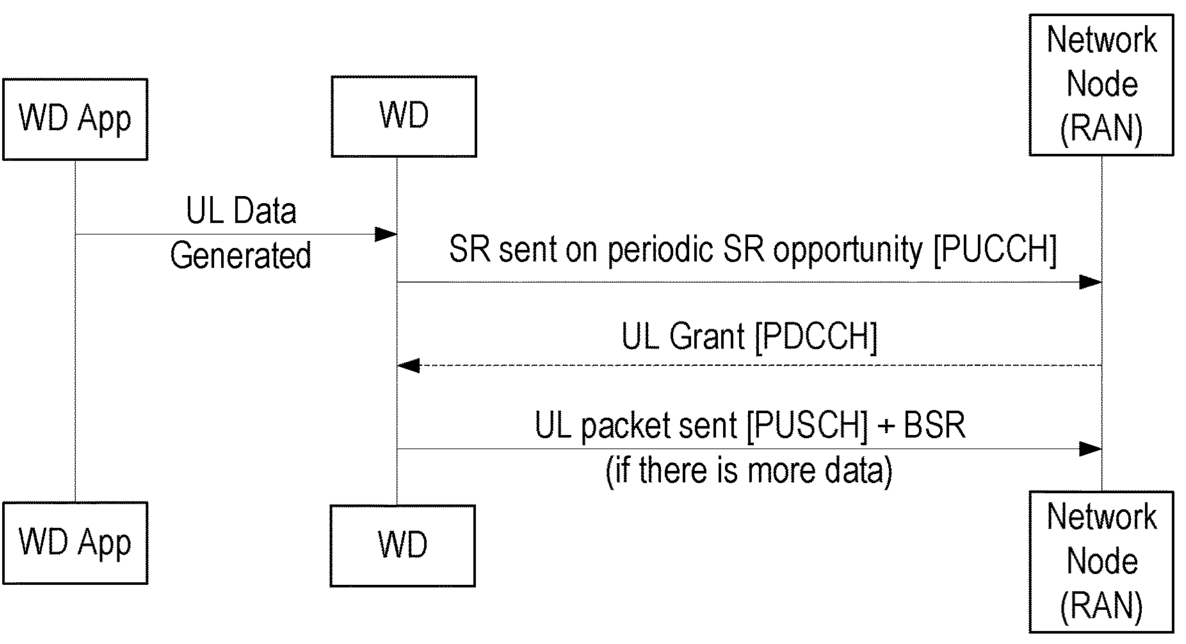
FIG. 1 is a flow chart of an example process utilizing a standard technique for UL scheduling.

In some embodiments, a WD App is provided. The WD App may be a software application and may be included in a WD, e.g., as a client application running on the WD. However, the WD App is not limited to being included in the WD and may be executed on any other device, e.g., a host computer, a network node, be a part of an operating system, an accelerator code, code designed to work with a specific scheduler, etc. The WD App can predict traffic/data that will be generated in the future, e.g., predicting the traffic/data that will be generated at least in the next few milliseconds. For example, the WD App can predict traffic/data because of the periodic nature, e.g., 60 frames per second of traffic, or because the WD App triggers the generation of traffic at a predetermined time t, but the traffic/data will take a few milliseconds to be converted into data ready for transmission. Traffic/data generated at a future point in time may be referred to herein as "future data" such as data determined/predicted that will occur at a future time (e.g., a current time+additional time). In some other embodiments, as a time has passed since a packet ping (e.g., transmitted by the WD App), data has been generated (e.g., previously predicted as future or non-causal data). In other words, the WD App may be aware of a time in the future at which a transmission may occur. In addition, ultra-low packet delay that achieves target application requirements is provided.

Before describing in detail example embodiments, it is noted that the embodiments reside primarily in combinations of apparatus components and processing steps related to preemptive scheduling requests (SRs) for ultra-low latency. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide application layer preemptive scheduling requests (SRs) for ultra-low latency. For example, by predicting data that will be generated by an application, an SR can be caused to be proactively transmitted from a WD so that a UL grant is transmitted from a network node to a WD to be able to respond to the demands imposed by the generated data.

Figure 2:
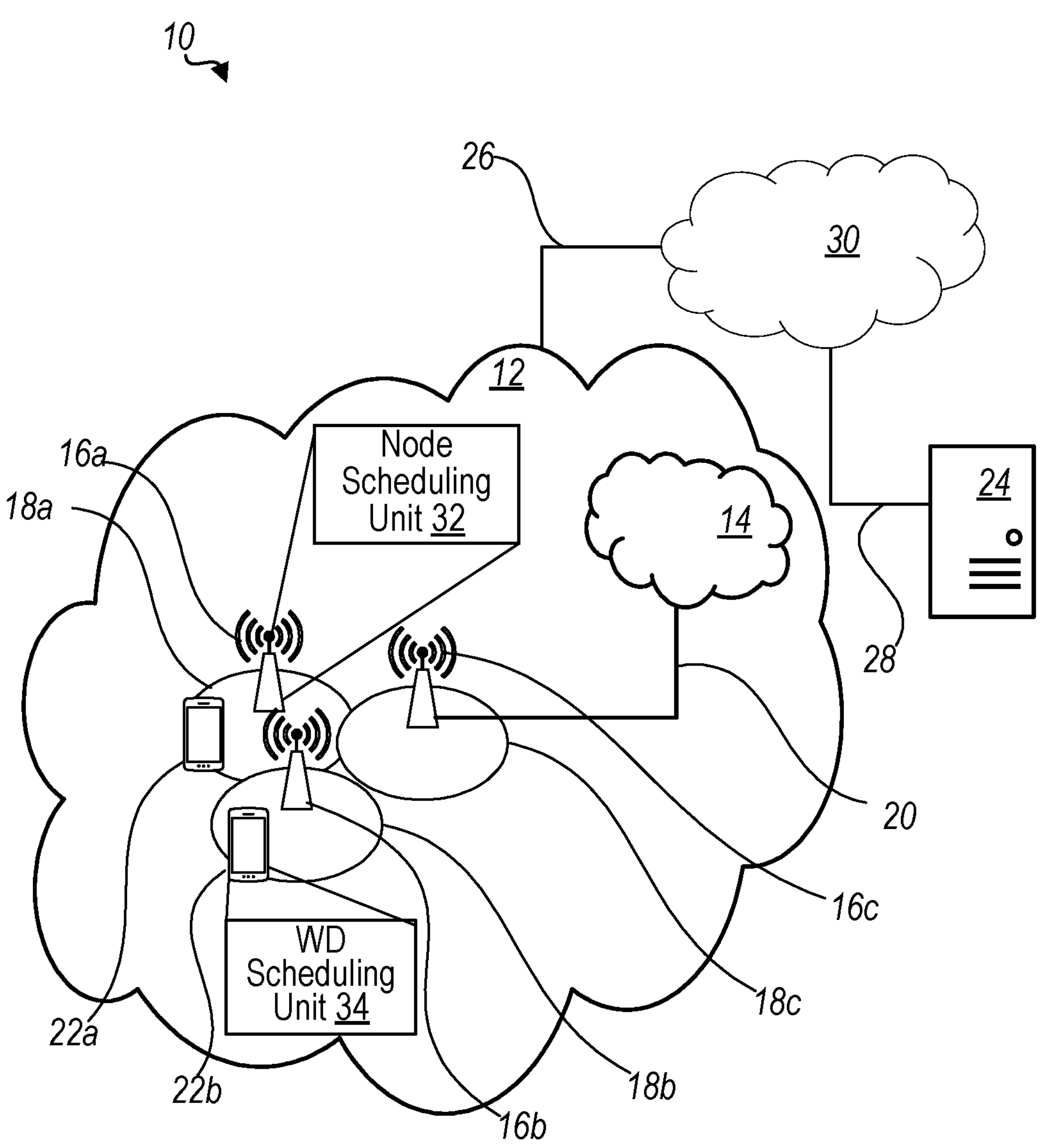
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of an example communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a node scheduling unit 32 which is configured at least to proactively provide UL grants based on scheduling requests on periodic SR opportunities. A wireless device 22 is configured to include a WD scheduling unit 34 which is configured at least to receive indication data associated with a future transmission, proactively transmit a scheduling request on a periodic SR opportunity, and proactively transmit a UL packet and a buffer status report (BSR).

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may include the node application 76, e.g., the WD App, and may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 and/or node application 76 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node scheduling unit 32 configured to at least to proactively provide UL grants based on scheduling requests on periodic SR opportunities.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may include the WD App and may be operable to provide a service to a human or non-human user via the WD 22, with the support of the host computer 24. In the host computer 24, an executing host application 50 may include the WD App and may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD scheduling unit 34 configured at least to receive indication data associated with a future transmission, proactively transmit a scheduling request on a periodic SR opportunity, and proactively transmit a UL packet and a buffer status report (BSR).

Figure 3:
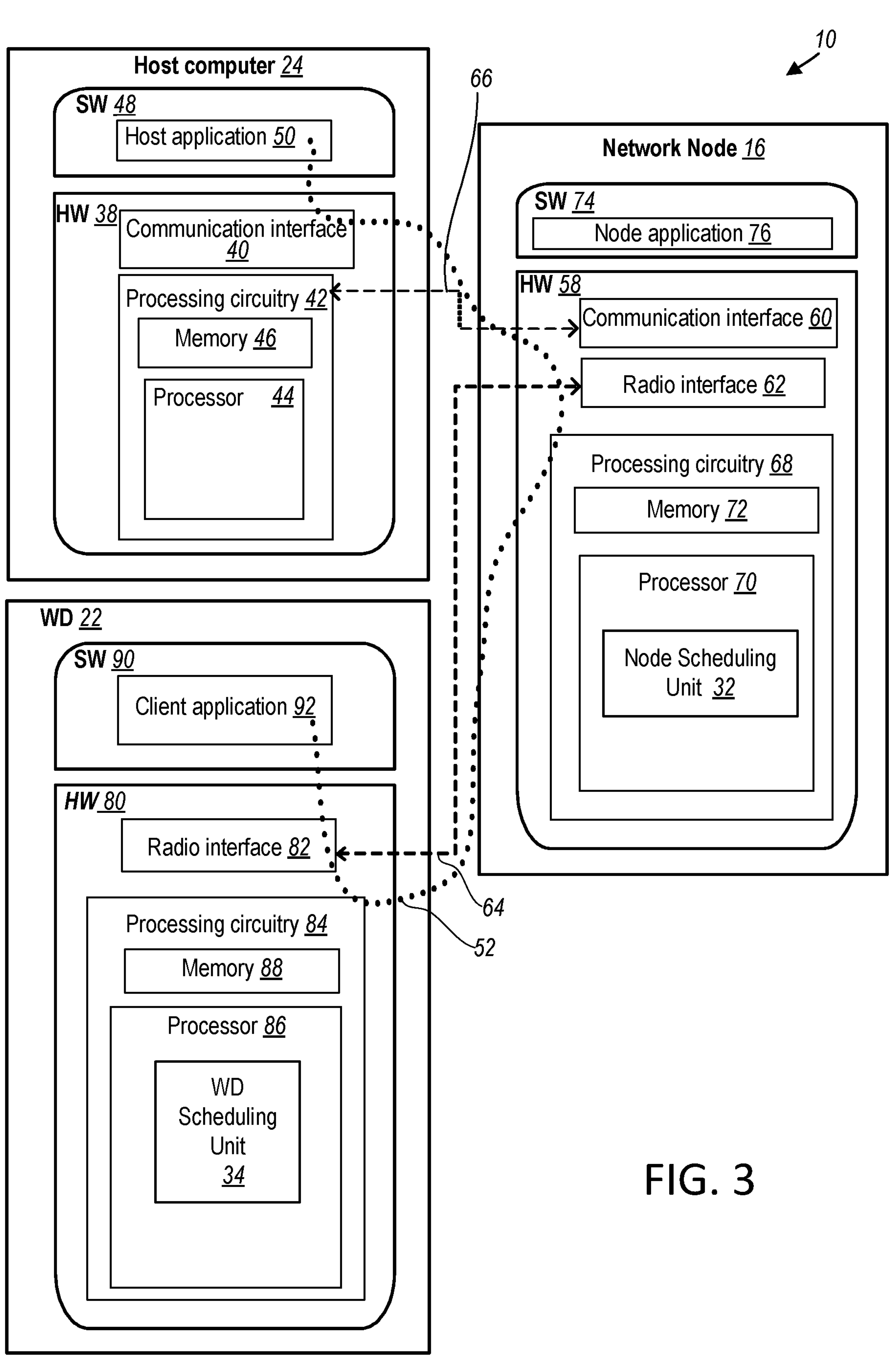
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as node scheduling unit 32, and WD scheduling unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
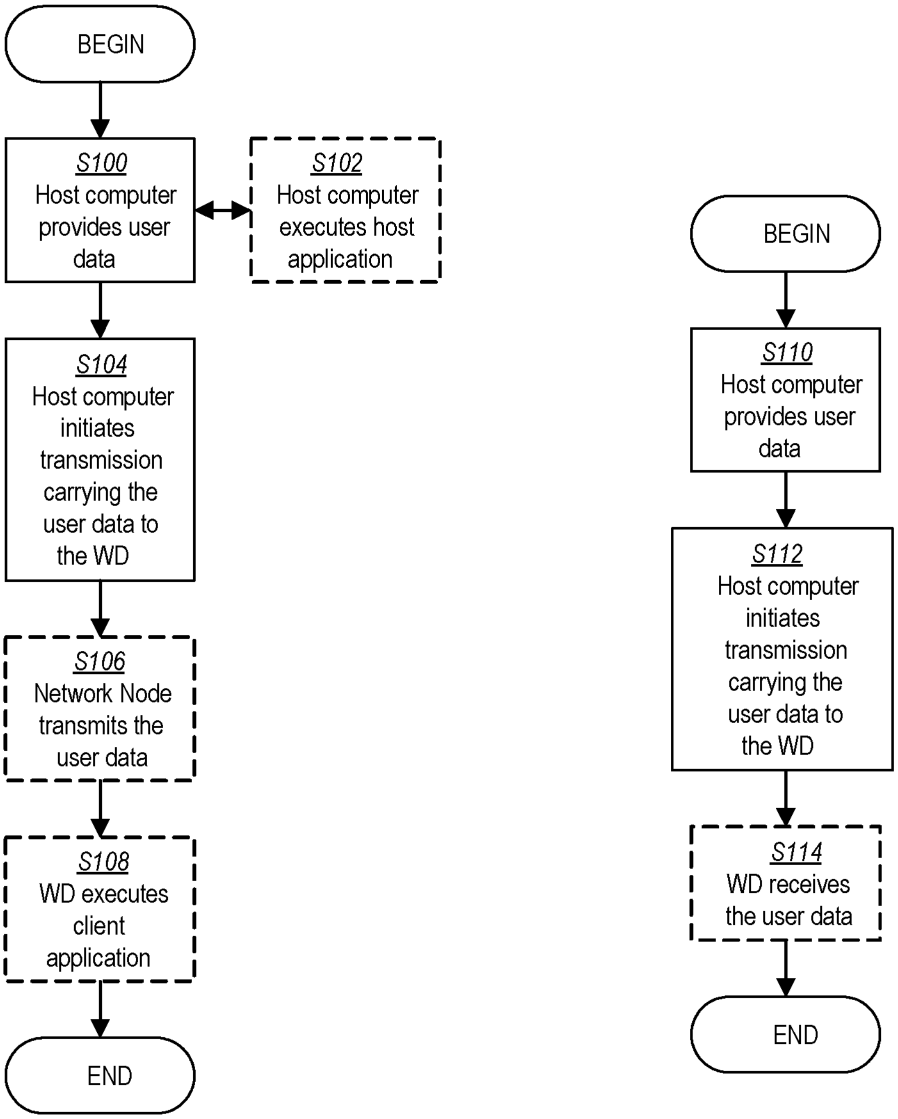
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
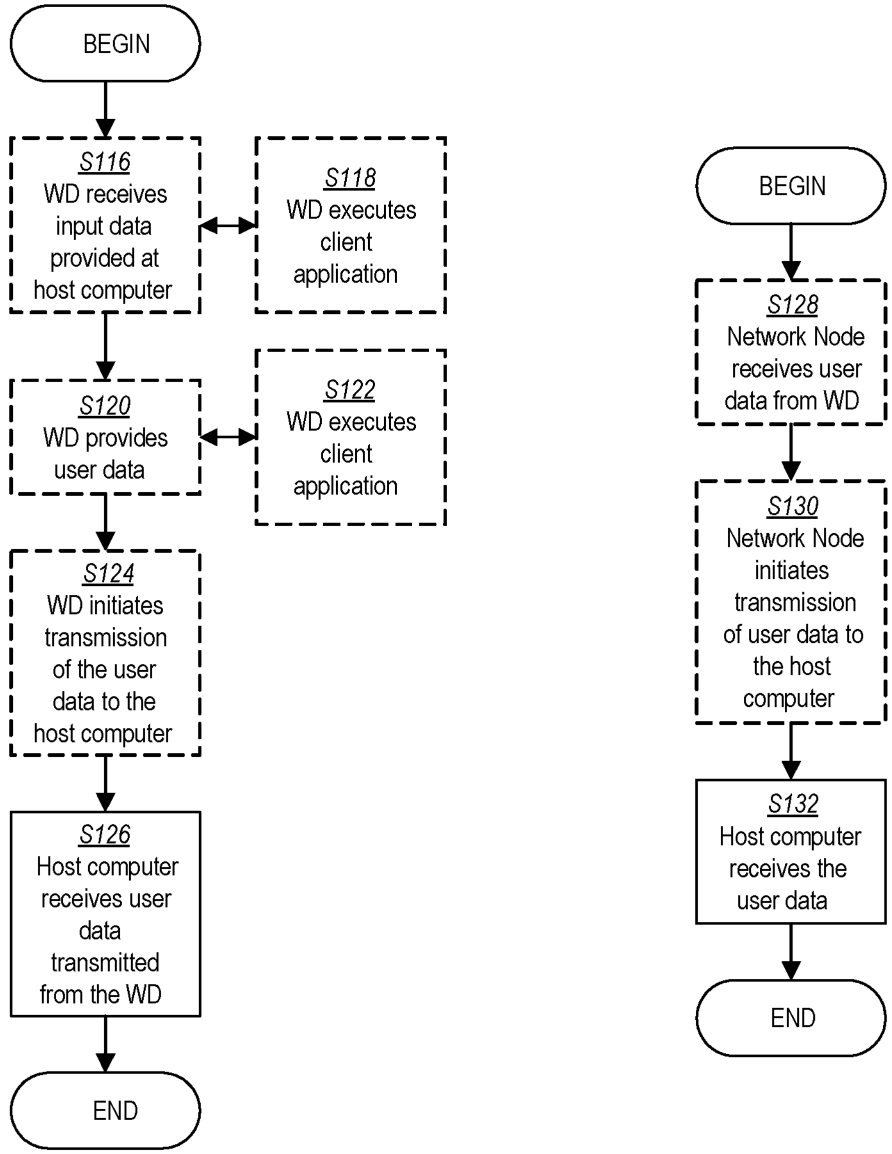
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
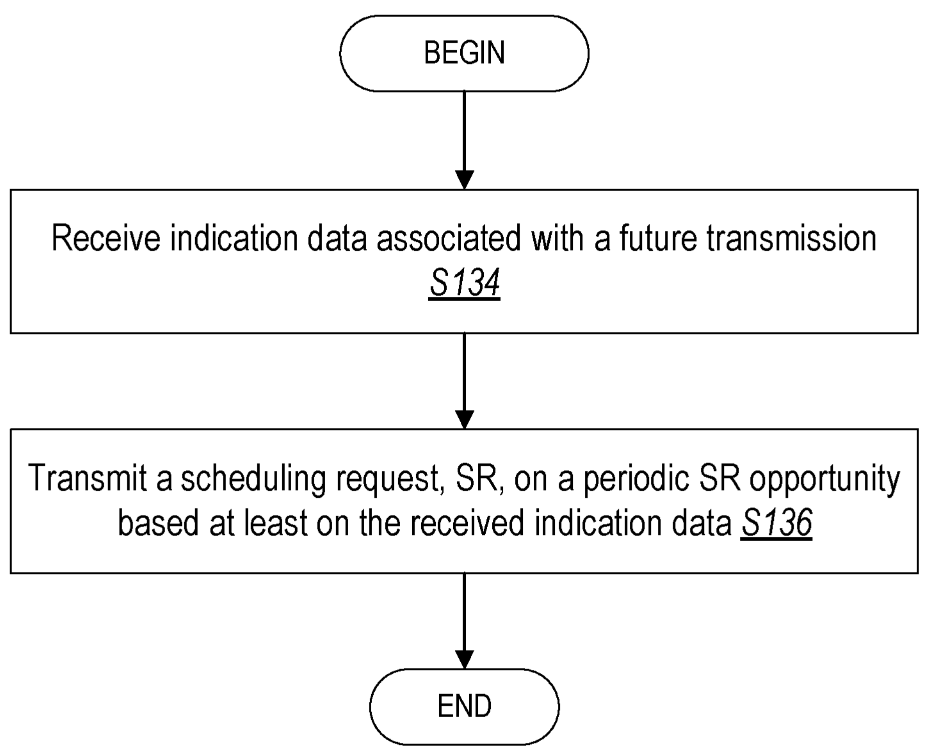
FIG. 8 is a flowchart of an example method in a wireless device according to some embodiments of the present disclosure.

FIG. 8 is a flowchart of an example method in a wireless device 22 according to some embodiments of the present disclosure for application layer preemptive scheduling requests (SRs) for ultra-low latency. One or more blocks described herein may be performed by one or more elements of wireless device 22 such as by one or more of processing circuitry 84 (including the WD scheduling unit 34), processor 86, radio interface 82, and/or client application 92. The method includes receiving, such as via processing circuitry 84 and/or processor 86 and/or radio interface 82 and/or client application 92, indication data associated with a future transmission (Block S134) and transmitting, such as via processing circuitry 84 and/or processor 86 and/or radio interface 82 and/or client application 92, a scheduling request (SR) on a periodic SR opportunity based at least on the received indication data (Block S136).

In some embodiments, the indication data associated with a future transmission may be associated with a packet ping at a predetermined time based on a time offset, the time offset being determined based on at least one of a multi-armed bandit framework and interactions with a RAN chipset. The indication data associated with a future transmission may also be associated with a special trigger message sent to the RAN chipset, the special trigger message indicating a time that a packet will be generated. The indication data associated with a future transmission may be further associated with an indication to the WD that a predetermined amount of data at a predetermined time will be available for transmission, the indication to the WD being one of a periodic indication and a non-periodic indication.

In other embodiments, the method further includes receiving a first UL grant based at least on the SR on the periodic SR opportunity and transmitting at least a first UL packet and a first buffer status report (BSR) after receiving the first UL grant, the buffer status report (BSR) including at least one of future data and non-causal data. In another embodiment, the method further includes receiving generated uplink (UL) data for a transmission of at least a second UL packet associated with the generated UL data, receiving a second UL grant, and transmitting at least the second UL packet and a second BSR after receiving the second UL grant.

Figure 9:
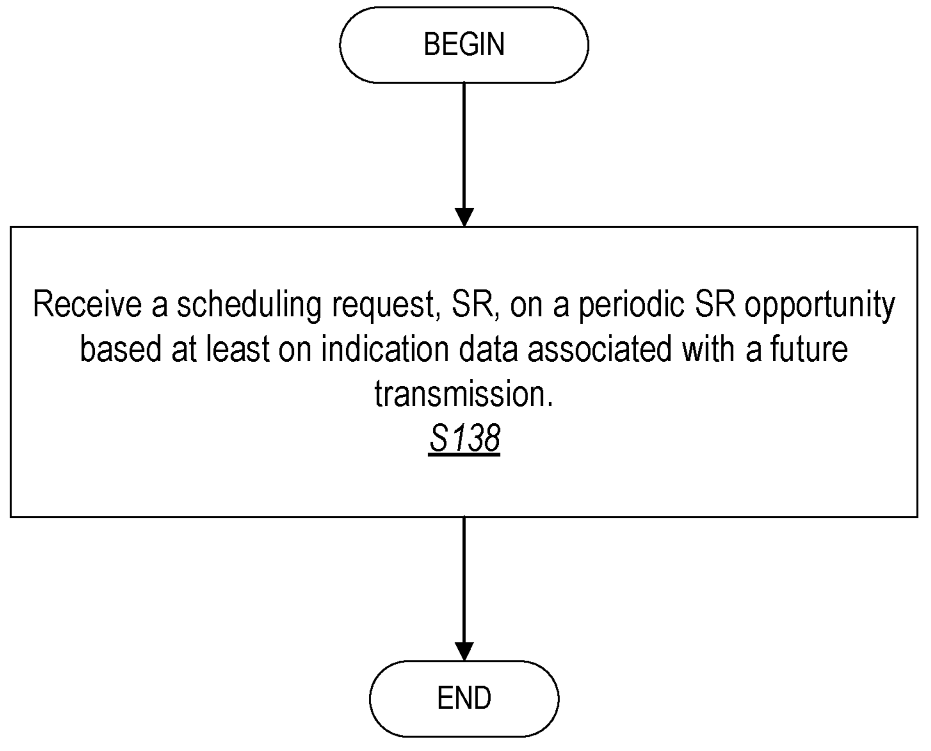
FIG. 9 is a flowchart of an example process in a network node according to some embodiments of the present disclosure.

FIG. 9 is a flowchart of an example method in a network node 16 for application layer preemptive scheduling requests (SRs) for ultra-low latency. One or more blocks described herein may be performed by one or more elements of network node 16 such as by one or more of processing circuitry 68 (including the node scheduling unit 32), processor 70, radio interface 62 and/or communication interface 60. The method includes receiving, such as via processing circuitry 68 and/or processor 70 and/or radio interface 62 and/or communication interface 60, a scheduling request (SR) on a periodic SR opportunity based at least on indication data associated with a future transmission (Block S138).

In some embodiments, the method includes transmitting a first UL grant based at least on the SR on the periodic SR opportunity and receiving at least a first UL packet and a first buffer status report (BSR) after transmitting the first UL grant, the buffer status report (BSR) including at least one of future data and non-causal data. In other embodiments, the method further includes transmitting a second UL grant and receiving at least the second UL packet and a second BSR after transmitting the second UL grant. In another embodiment, the method further includes receiving a query for a RAN chipset to provide a time offset at which the indication data is to be received by the WD and transmitting the time offset to the WD.

Figure 10:
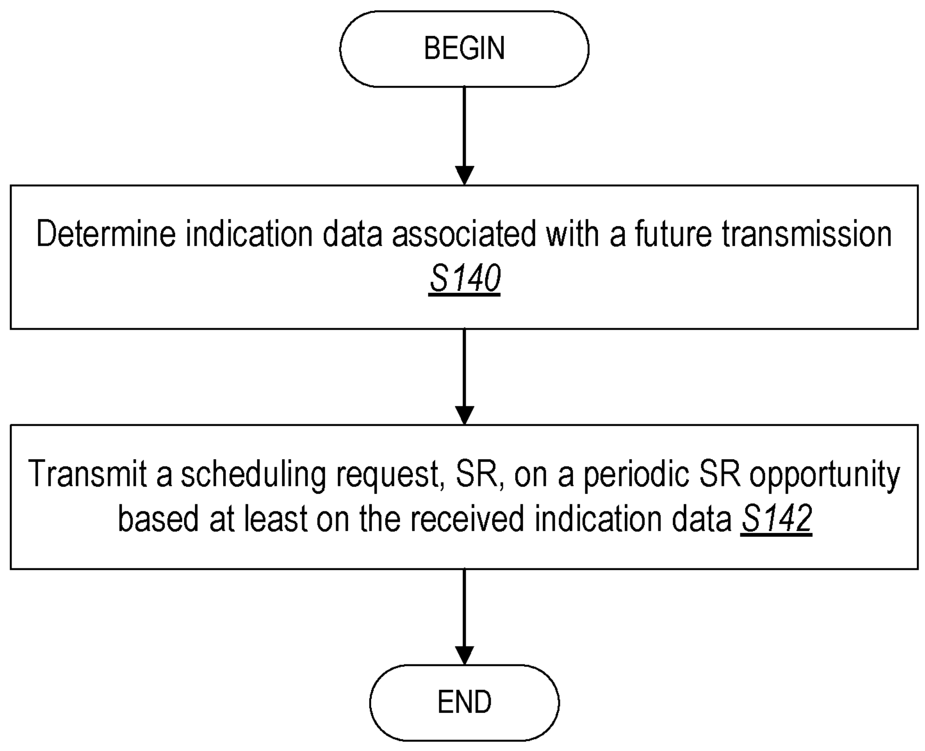
FIG. 10 is a flowchart of another example method in a wireless device according to some embodiments of the present disclosure.

FIG. 10 is a flowchart of another example method in a wireless device 22 according to some embodiments of the present disclosure. One or more blocks described herein may be performed by one or more elements of wireless device 22 such as by one or more of processing circuitry 84 (including the WD scheduling unit 34), processor 86, radio interface 82, and/or client application 92. The method includes determining (Block S140), such as via processing circuitry 84 and/or processor 86 and/or radio interface 82 and/or client application 92, indication data associated with a future transmission and transmitting (Block S142), such as via processing circuitry 84 and/or processor 86 and/or radio interface 82 and/or client application 92, a scheduling request, SR, on a periodic SR opportunity based at least on the received indication data.

In some embodiments, the indication data associated with the future transmission is associated with a packet ping at a predetermined time based on a time offset, where the time offset is determined based on the future transmission.

In some other embodiments, the indication data associated with the future transmission is associated with a trigger message transmitted to a chipset of the WD 22, where the trigger message indicates a time that a packet will be generated.

In an embodiment, the indication data associated with the future transmission is associated with an indication to the WD 22 that a predetermined amount of data at a predetermined time will be available for transmission, where the indication to the WD 22 is one of a periodic indication and a non-periodic indication.

In another embodiment, the method further includes receiving a first uplink (UL) grant based at least on the SR on the periodic SR opportunity; and transmitting at least a first UL packet and a first buffer status report (BSR) in response to receiving the first UL grant.

In some embodiments, the BSR includes at least one of future data and non-causal data, where the non-causal data is transmittable one of within the WD 22 and to the network node 16.

In some other embodiments, the method further includes determining generated UL data for a transmission of at least one UL packet associated with the generated UL data, where the generated UL data is generated by a WD application 100.

In an embodiment, the method further includes receiving a second UL grant; and transmitting at least the second UL packet and a second buffer status report, BSR.

In another embodiment, at least the second UL packet and the second buffer status report, BSR, are transmitted in response at least to receiving at least any one of the second UL grant from the network node 16 and generated UL data from a WD application 100.

In some embodiments, method further includes predicting traffic associated with the future transmission based in part on input received from the WD application 100.

Figure 11:
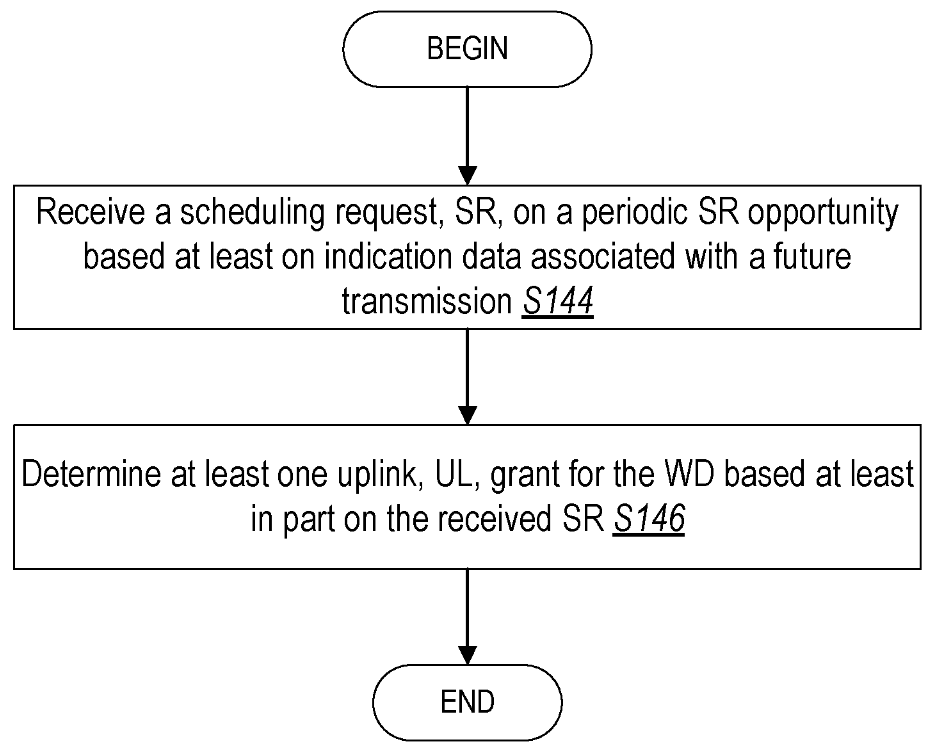
FIG. 11 is a flowchart of another example process in a network node according to some embodiments of the present disclosure.

FIG. 11 is a flowchart of an example method in a network node 16 for application layer preemptive scheduling requests (SRs) for ultra-low latency. One or more blocks described herein may be performed by one or more elements of network node 16 such as by one or more of processing circuitry 68 (including the node scheduling unit 32), processor 70, radio interface 62 and/or communication interface 60. The method includes receiving (Block S144), such as via processing circuitry 68 and/or processor 70 and/or radio interface 62 and/or communication interface 60, a scheduling request, SR, on a periodic SR opportunity based at least on indication data associated with a future transmission and determining (Block S146)), such as via processing circuitry 68 and/or processor 70 and/or radio interface 62 and/or communication interface 60, at least one uplink, UL, grant for the WD (22) based at least in part on the received SR.

In some embodiments, the indication data associated with the future transmission is associated with a packet ping associated with the WD 22 at a predetermined time based on a time offset, the time offset being determined based on the future transmission.

In some other embodiments, the indication data associated with the future transmission is associated with a trigger message transmitted to a chipset of the WD 22, where the trigger message indicates a time that a packet will be generated.

In an embodiment, the indication data associated with the future transmission is associated with an indication to the WD 22 that a predetermined amount of data at a predetermined time will be available for transmission, where the indication to the WD 22 is one of a periodic indication and a non-periodic indication.

In another embodiment, the method further includes transmitting a first uplink (UL) grant based at least on the SR on the periodic SR opportunity; and receiving at least a first UL packet and a first buffer status report, BSR, in response to the first UL grant.

In some embodiments, the buffer status report, BSR, includes at least one of future data and non-causal data.

In some other embodiments, the method further includes transmitting a second UL grant and receiving at least the second UL packet and a second buffer status report, BSR.

In an embodiment, at least the second UL packet and the second BSR are received in response at least to at least any one of the second UL grant from the network node 16 and generated UL data from a WD application 100.

In another embodiment, the generated UL data from a WD application 100 is based at least in part on predicted traffic associated with the future transmission.

In some embodiments, the method further includes transmitting a message to WD 22, where the message triggers a chipset, e.g., processing circuitry 84, of the WD 22 to provide a time offset at which generated uplink, UL, data will be available.

Having described the general process flow of arrangements of the disclosure and having provided examples of hardware and software arrangements for implementing the processes and functions of the disclosure, the sections below provide details and examples of arrangements for application layer preemptive SRs for ultra-low latency.

In some embodiments, WD App 100 may be a software application and/or be included in a WD 22, e.g., as software 90 and/or a client application 92 running on WD 22 and/or as part of processing circuitry 84 and/or WD scheduling unit 34 However, WD App 100 is not limited to being included in the WD 22 and may be included in and/or executed on any other device, e.g., a host computer 24 such as part of software 48 and/or host application 50 and/or processing circuitry 42, a network node 16 such as part of software 78 and/or node application 76 and/or processing circuitry 68 and/or node scheduling unit 32.

For ease of understanding, WD App 100 is described with respect to WD 22 and/or any the components of WD 22 but is not limited as such and may refer to network node 16 and/or host computer 24 and/or their respective components. In some other embodiments, WD App 100 may communicate, e.g., transmit/receive data/messages/signals, with any component of system 10 of FIG. 3, e.g., WD App 100 may communicate with hardware 80 and/or processing circuitry 84 and/or processor 86 and/or memory 88 and/or WD scheduling unit 34. Further, WD App 100 transmitting/receiving, e.g., messages, indications, etc., to/from the WD 22 may refer to WD App 100 transmitting/receiving, e.g., messages, indications, etc., to/from any component of WD 22, e.g., hardware 80, processing circuitry 84, etc.

In some other embodiments, a chipset is described. The chipset may refer to any chipset such as a RAN chipset, a WD chipset, etc. Further, the chipset may refer to hardware 38 (and/or any of its components) of the host computer and/or hardware 58 (and/or any of its components) of the network node 16 and/or hardware 80 (and/or any of its components) of WD 22. For ease of understanding, chipset is described with respect to WD 22, e.g., a WD chipset, but is not limited as such and may refer to network node 16, e.g., a RAN chipset, and/or host computer 24.

Figure 12:
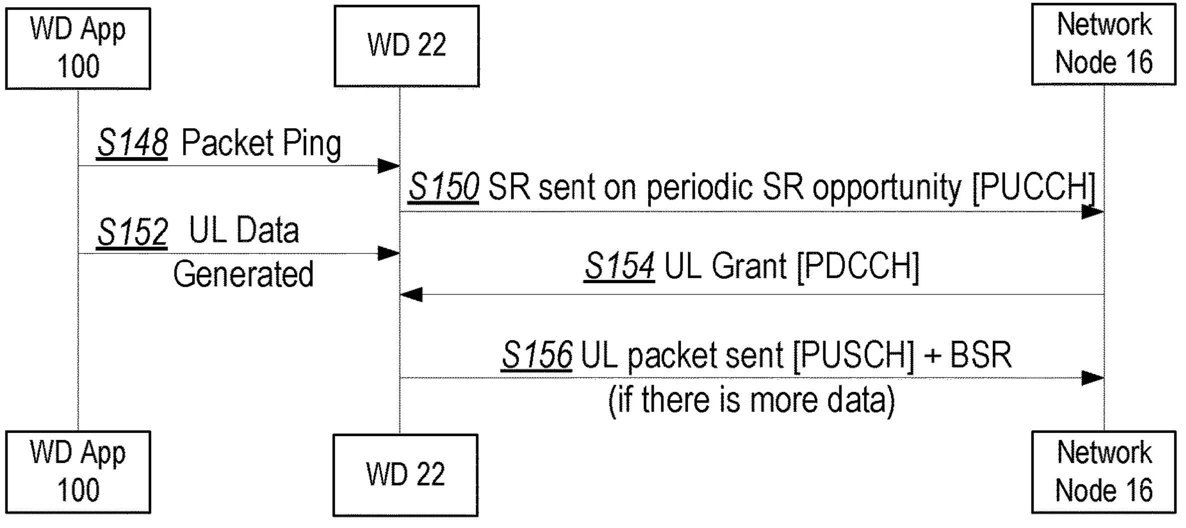
FIG. 12 is a flowchart of an example process in in which a packet is sent to trigger a scheduling request according to some embodiments of the present disclosure.

FIG. 12 is a flowchart of an example method in which a packet is sent to trigger a scheduling request according to some embodiments of the present disclosure. At step 148, a WD App 100, such as via host application 50, software 74, and/or client application 92, sends a small packet at time t−t_0 to WD 22, such as a packet ping. This small packet will trigger the WD 22 to transmit, at step S150, an SR to the network node 16 on a periodic SR opportunity and reduce overall delay. The best value for t_0 may vary based on many parameters and may vary over time as well. At step 152, the WD App 100, e.g., via processing circuitry 84, transmits generated uplink data to WD 22. At step S154, the network node 16 transmits, e.g., via radio interface 62, a UL grant to the WD 22 such as via PDCCH. After receiving the UL grant, at step S156, the WD 22 transmits, e.g., via radio interface 82, a UL packet, such as via PUSCH, and a BSR. The BSR may be transmitted whether there is more data or not.

The WD App 100 can determine, e.g., via processing circuitry 84, the time, including a time offset, at which to send the small packet through several processes, including but not limited to trial and error, interactions with a chipset (e.g., hardware 80 and/or processing circuitry 84), and special trigger messages to the chipset. By trial and error, the WD App 100 probes, e.g., via processing circuitry 84, different times and determines a time offset. According to a non-limiting example, the time offset may be determined using any of a variety of optimization techniques, such as a multi-armed bandit (e.g., using reinforcement learning) framework, in which the different quantized offsets are considered different arms in the bandit. Determinations based on trial and error are not limited to the multi-armed bandit framework. Other processes are also possible.

Figure 13:
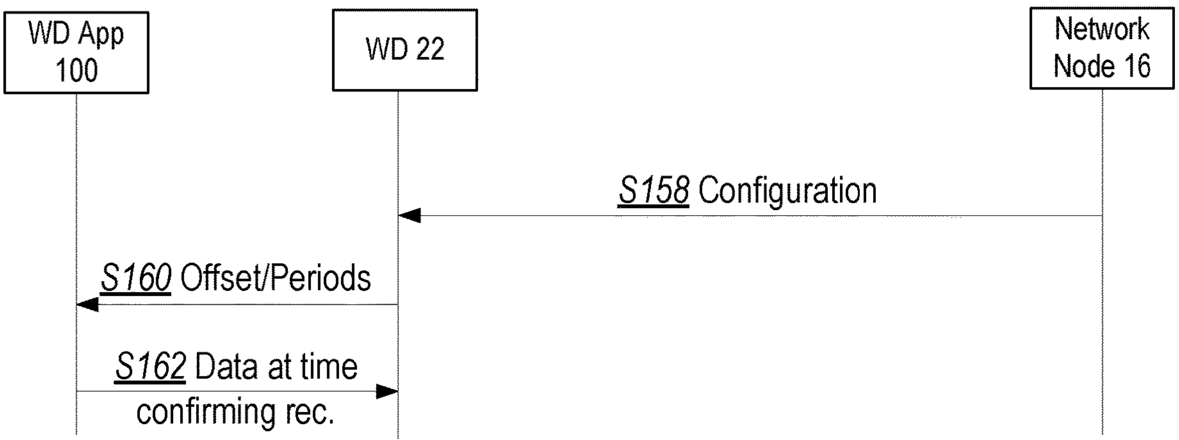
FIG. 13 is a flowchart of an example process for determining a time and/or time offset by interacting with a chipset according to some embodiments of the present disclosure.

FIG. 13 is a flowchart of an example process for determining a time and/or time offset by interacting with a chipset. At step, 158, network node 16 transmits, e.g., via radio interface 62, a configuration to WD 22. After receiving the configuration from the network node 16, at step S160, the WD 22 transmits the time and/or time offset to the WD App 100, e.g., the transmission occurring within the WD 22. At step 162, the WD App 100 transmits, e.g., within the WD 22, data conforming to the received time and/or time offset. Accordingly, the chipset (e.g., hardware 80 and/or processing circuitry 84) may be queried for a best time slot offset, e.g., the time and/or the time offset, to use for a particular flow, which allows the chipset (e.g., hardware 80 and/or processing circuitry 84) to access the current configured parameters, e.g., TDD pattern, configured grant configurations, SR patterns, to determine the best t_0 to transmit. The best time slot offset may be indicated as a list of time periods, e.g., a list of time periods in a predefined order. Alternatively, the best time slot offset may be indicated as a single value. The single value may be rejectable and/or rejected by the WD App 100. According to another non-limiting example, the time period may be indicated in an absolute time and/or a clock time. The time period may also be provided along with an associated period. The time period may be provided once or multiple times, e.g., some time before a predefined type of transmission. According to some non-limiting examples, the time period may be provided by data included in a 3-ms type message.

Figure 14:
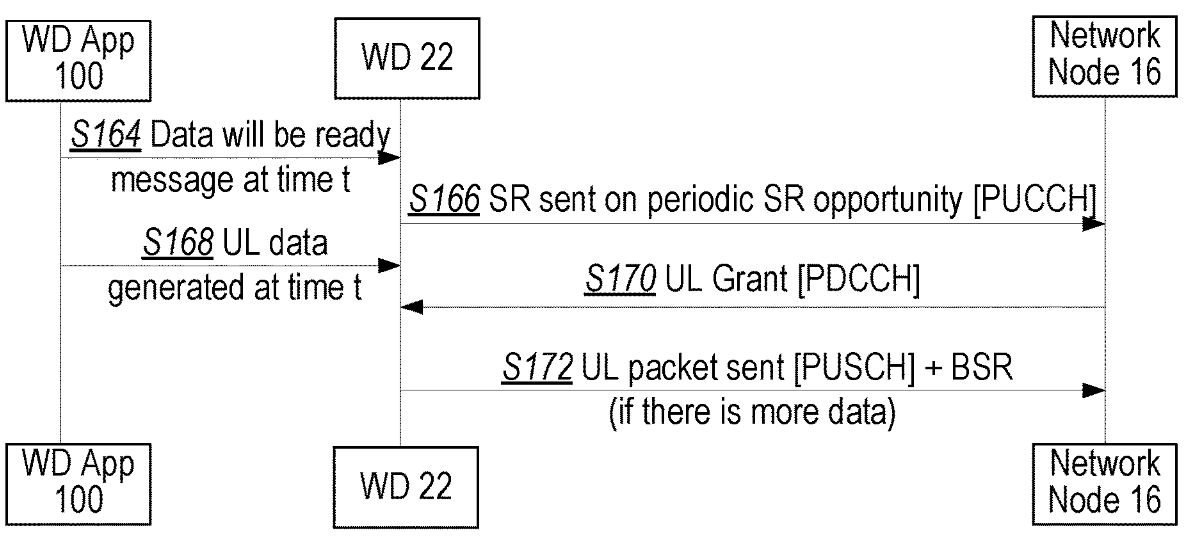
FIG. 14 is a flowchart of an example process for determining a time and/or time offset by special trigger message to a chipset according to some embodiments of the present disclosure.

FIG. 14 is a flowchart of an example process for determining a time and/or time offset by special trigger message to a chipset, e.g., hardware 80 and/or processing circuitry 84. According to this example process, the WD App 100 transmits, e.g., within WD 22, a signal indicating the time that a packet will be generated or similar information. The chipset (e.g., hardware 80 and/or processing circuitry 84) is then tasked with activating appropriate RAN features, e.g., SR signal at a predetermined time, a BSR signal, to satisfy the requirements of the received special triggered message. As shown in FIG. 14, at step 164, the WD App 100 transmits a message to the WD 22 indicating that data will be ready at time t. at step S166, the WD 22 then transmits, e.g., via radio interface 82, an SR on a periodic SR opportunity, such as via PUCCH, to the network node 16. At step S168, uplink data generated by the WD App 100 is transmitted to the WD 22. At step S170, WD 22 receives a UL grant, such as via PDCCH, and at step 172, WD 22 transmits to the network node 16 a UL packet, such as via PUSCH, and a BSR.

Non Causal BSR Approach

Rather than transmitting an indication that some traffic will be available, an indication that includes the time in which data will be available and the amount of data which will be available may be provided. This information may include specific times that it is available or leave some degree of uncertainty, e.g., data will be available between time x and y.

Non-causal information can be provided to the chip set (e.g., without standard change) of the WD 22 or signaled over the air to the network node 16, e.g., gNB, via new signaling.

In some embodiments, signaling may be modified/generated according to the principles in the present disclosure. BSR, which indicates that data has already been received by the WD 22, may be artificially inflated to reflect traffic that has not been received by the WD 22 yet. To that end, the WD App 100 transmits an indication to the WD 22 (e.g., processing circuitry 84) that predetermined amounts of data at time T will be available. This indication may be periodic in nature or signaled dynamically at need.

Figure 15:
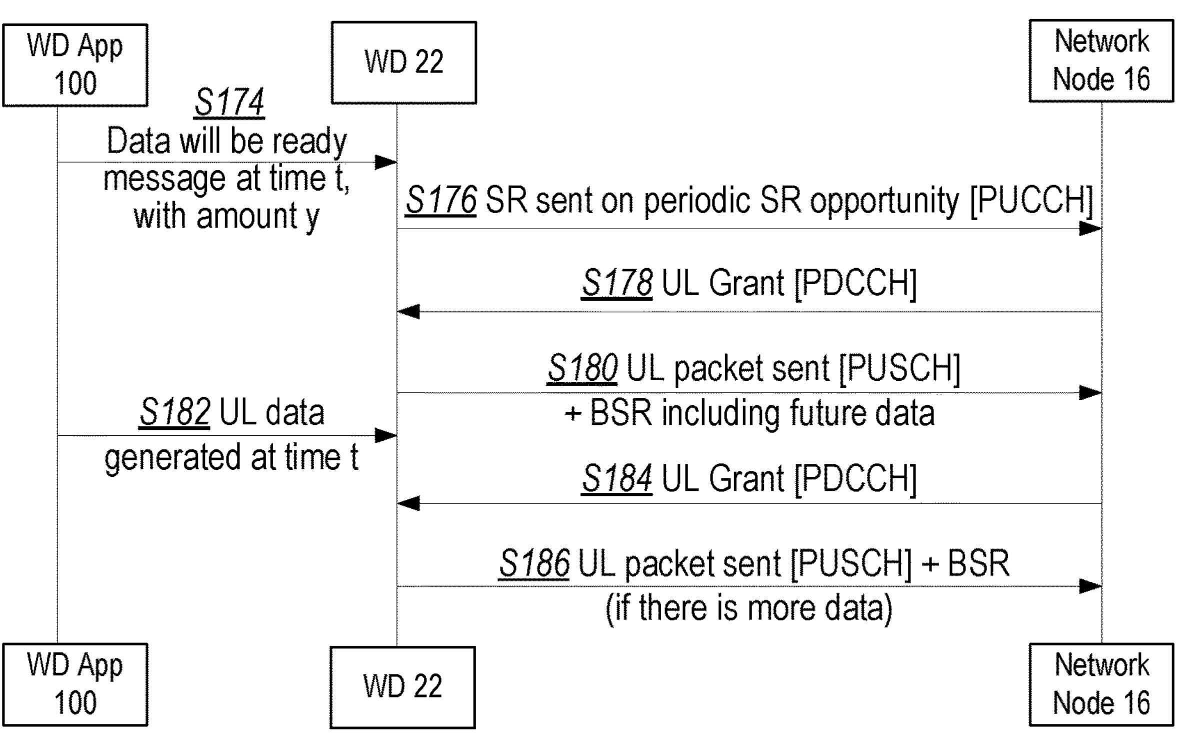
FIG. 15 is a flowchart of an example backward compatible process according to some embodiments of the present disclosure.

FIG. 15 is a flowchart of an example backward compatible process. At step S174, WD App 100 transmits to the WD 22 (e.g., processing circuitry 84) a message indicating that data will be ready at time, T, and the amount of data, Y. At step S176, the WD 22 in turn transmits an SR on a periodic SR opportunity, such as PUCCH, to the network node 16. After receiving the SR, at step 178, the network node 16 transmits a UL grant, such as via PDCCH, to the WD 22. The UL grant (S170) may, according to some non-limiting examples, be a UL grant of a first predetermined size, e.g., a "small" UL grant. At step 180, the WD 22 transmits a UL packet to the network node 16, such as via PUSCH, and a BSR including at least future data. At step 182, the WD App 100 transmits generated UL data to the WD 22, e.g., processing circuitry 84. At step 184, the network node 16 transmits another UL grant, such as via PDCCH, to the wireless device 22. The UL grant may, according to some non-limiting examples, be a UL grant of a second predetermined size, e.g., a "large" UL grant such that the first predetermined size is less than the second predetermined size. At step 186, the WD 22 then transmits a UL packet, such as via PUSCH, and a BSR to the network node 16.

In some embodiments, the network node 16 may receive, e.g., from WD 22, an indication that the WD 22 will perform the process described above and shown in FIG. 15. However, receiving the indication at the network node 16 is not limited to being before the steps described above and shown in FIG. 13 and may be before any steps performed according to the principles of the present disclosure. The network node 16, e.g., gNB, may use the indication to recognize that the WD 22 is not operating outside of normal behavior. The indication may be included in user capability reports and/or through other processes, e.g., standardized processes. Alternatively, receiving/transmitting the indication may be enabled or disabled, e.g., locally, via network signaling such as RRC configuration, MAC CE commands, or any other signaling process.

In some other embodiments, a the BSR feedback is modified to include the time in which data will be ready from the WD App 100. For example, at time T, a predetermined amount of data Y will be available. This non-causal BSR may be also be modified to include a period field, e.g., every x'th slot a certain amount of data will be available or generated, i.e., recurring but referenced in a single instance.

Some nonlimiting examples of the amount of data include a value, a range of values, or a distribution, e.g., a probability distribution such as a probability distribution where X bits are likely, X+Y bits are unlikely, etc. In some embodiments, the data may be obtained from a network node, a cloud environment, through 3rd party verification/authentication nodes, which ensures that the WD App 100 has the authority to request this information.

In some other embodiments, the non-causal BSR may be represented by a new Medium Access Control Control Element (MAC-CE) with the time of transmission being relative to a slot that a first Hybrid Automatic Repeat Request (HARQ) process was scheduled in. Alternatively, the non-causal BSR may be represented in terms of slot number, subframe number (SFN) and/or slot index. The non-causal BSR may be formatted significantly to provide a plurality of formats. For example, information included in the BSR may be broken and signaled via several different signals, e.g., in one signal, such as RRC signaling, period and volume information may be transmitted, while a second signal may activate or deactivate a usage of such a periodic non-causal BSR. According to some non-limiting examples, the second signal may be transmitted over PUCCH, RACH, or PUSCH signal.

Figure 16:
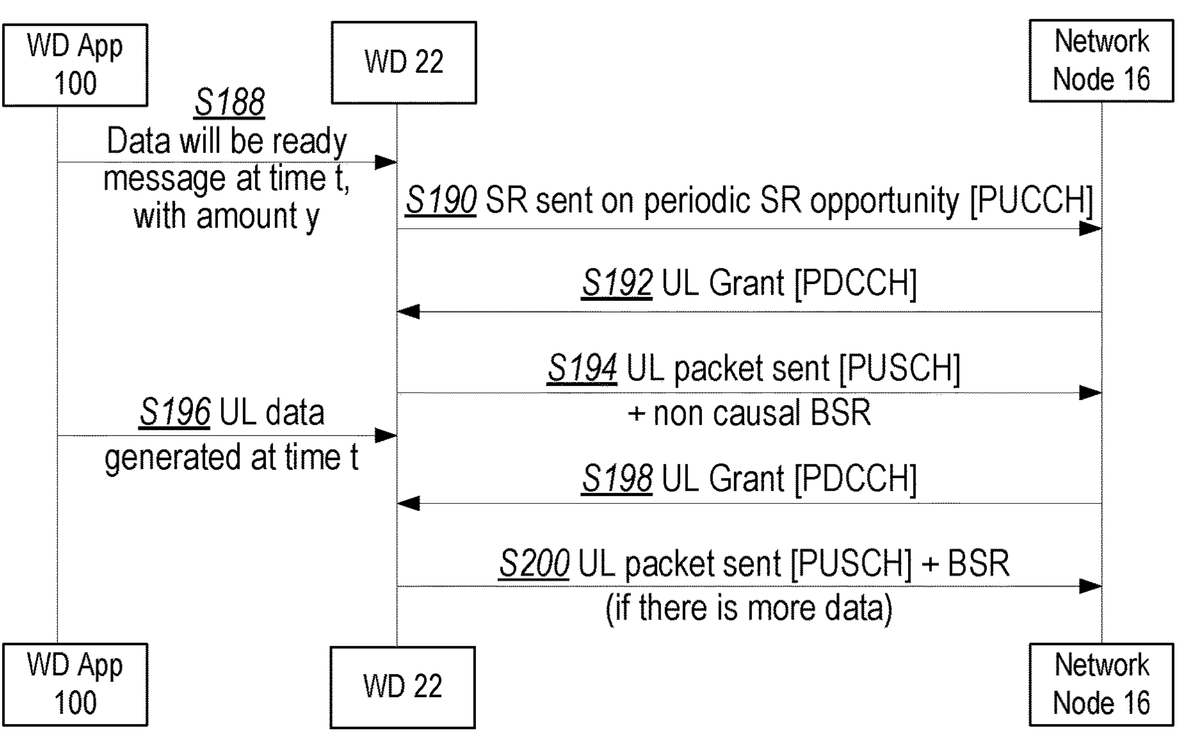
FIG. 16 is a flowchart of an example process in which the BSR is a non-causal BSR according to some embodiments of the present disclosure.

FIG. 16 is a flowchart of an example process in which the BSR is a non-causal BSR. At step 188, WD App 100 transmits a message to the WD 22 (e.g., processing circuitry 84) indicating that data will be ready at a predetermined time, T. After receiving the message, at step S190, the WD 22 transmits, e.g., via radio interface 82, an SR on a periodic SR opportunity, such as via PUCCH, to the network node 16. At step 192, the network node 16 then transmits, e.g., via radio interface 62, a UL grant, such as via PDCCH, to the WD 22. The UL grant (S184) may, according to some non-limiting examples, be a UL grant of a third predetermined size, e.g., a small UL grant. At step 194, the WD 22 then transmits to the network node 16 a UL packet, such as via PUSCH, and a non-causal BSR. At step 196, generated UL data is transmitted by the WD App 100 to the WD 22 (e.g., processing circuitry 84). At step 198, WD 22 receives another UL grant, such as via PDCCH, from the network node 16. The UL grant may, according to some non-limiting examples, be a UL grant of a fourth predetermined size, e.g., a large UL grant such that the third predetermined size is less than the fourth predetermined size. At step 200, the WD 22 then transmits to the network node 16 another UL packet and another BSR. The BSR may be included in cases where there is more data to be transmitted but be transmitted even if there is no more data to be transmitted.

The following is a nonlimiting list of embodiments according to the principles of the present disclosure:

Embodiment A1. A wireless device (WD) configured to communicate with a network node, the WD configured to and/or comprising a radio interface and/or processing circuitry configured to:

receive indication data associated with a future transmission; and transmit a scheduling request (SR) on a periodic SR opportunity based at least on the received indication data.

Embodiment A2. The WD of Embodiment A1, wherein the indication data associated with a future transmission is associated with one of:

a packet ping at a predetermined time based on a time offset, the time offset being determined based on at least one of a multi-armed bandit framework and interactions with a RAN chipset;

a special trigger message sent to the RAN chipset, the special trigger message indicating a time that a packet will be generated; and an indication to the WD that a predetermined amount of data at a predetermined time will be available for transmission, the indication to the WD being one of a periodic indication and a non-periodic indication.

Embodiment A3. The WD of any one of Embodiments A1 and A2, the WD and/or the radio interface and/or the processing circuitry being further configured to:

receive a first UL grant based at least on the SR on the periodic SR opportunity; and transmit at least a first UL packet and a first buffer status report (BSR) after receiving the first UL grant, the buffer status report (BSR) including at least one of future data and non-causal data.

Embodiment A4. The WD of any one of Embodiments A1-A3, the WD and/or the radio interface and/or the processing circuitry being further configured to:

receive generated uplink (UL) data for a transmission of at least a second UL packet associated with the generated UL data;

receive a second UL grant; and transmit at least the second UL packet and a second BSR after receiving the second UL grant.

Embodiment B1. A method implemented in a WD, the method comprising:

receiving indication data associated with a future transmission; and transmitting a scheduling request (SR) on a periodic SR opportunity based at least on the received indication data.

Embodiment B2. The method of Embodiment B1, wherein the indication data associated with a future transmission is associated with one of:

a packet ping at a predetermined time based on a time offset, the time offset being determined based on at least one of a multi-armed bandit framework and interactions with a RAN chipset;

a special trigger message sent to the RAN chipset, the special trigger message indicating a time that a packet will be generated; and an indication to the WD that a predetermined amount of data at a predetermined time will be available for transmission, the indication to the WD being one of a periodic indication and a non-periodic indication.

Embodiment B3. The method of any one of Embodiments B1 and B2, the method further including:

receiving a first UL grant based at least on the SR on the periodic SR opportunity; and transmitting at least a first UL packet and a first buffer status report (BSR) after receiving the first UL grant, the buffer status report (BSR) including at least one of future data and non-causal data.

Embodiment B4. The method of any one of Embodiments B1-B3 the method further including:

receiving generated uplink (UL) data for a transmission of at least a second UL packet associated with the generated UL data;

receiving a second UL grant; and transmitting at least the second UL packet and a second BSR after receiving the second UL grant.

Embodiment C1. A network node configured to communicate with a wireless device (WD), the network node configured to and/or comprising a radio interface and/or processing circuitry configured to:

receive a scheduling request (SR) on a periodic SR opportunity based at least on indication data associated with a future transmission.

Embodiment C2. The network node of Embodiment C1, the network node and/or the radio interface and/or the processing circuitry being further configured to:

transmit a first UL grant based at least on the SR on the periodic SR opportunity; and receive at least a first UL packet and a first buffer status report (BSR) after transmitting the first UL grant, the buffer status report (BSR) including at least one of future data and non-causal data.

Embodiment C3. The network node of Embodiment C2, the network node and/or the radio interface and/or the processing circuitry being further configured to:

transmit a second UL grant; and receive at least the second UL packet and a second BSR after transmitting the second UL grant.

Embodiment C4. The network node of any one of Embodiments C1-C3, the network node and/or the radio interface and/or the processing circuitry being further configured to:

receive a query for a RAN chipset to provide a time offset at which the indication data is to be received by the WD; and transmit the time offset to the WD.

Embodiment D1. A method implemented in a network node configured to communicate with a wireless device (WD), the method:

receiving a scheduling request (SR) on a periodic SR opportunity based at least on indication data associated with a future transmission.

Embodiment D2. The method of Embodiment D1, the method further including:

transmitting a first UL grant based at least on the SR on the periodic SR opportunity; and receiving at least a first UL packet and a first buffer status report (BSR) after transmitting the first UL grant, the buffer status report (BSR) including at least one of future data and non-causal data.

Embodiment D3. The method of Embodiment D2, the method further including:

transmitting a second UL grant; and receiving at least the second UL packet and a second BSR after transmitting the second UL grant.

Embodiment D4. The method of any one of Embodiments D1-D3, the method further including:

receiving a query for a RAN chipset to provide a time offset at which the indication data is to be received by the WD; and transmitting the time offset to the WD.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a network node, the method comprising:

determining a future time at which data for a future transmission to the network node will be available and an amount of data that will be available for the future transmission;

determining a time offset for the future transmission based on at least one of: applying one or more optimization techniques or performing one or more interactions with a chipset of the WD;

determining indication data associated with the future transmission, the indication data indicating the amount of data and a predetermined time for the future transmission, the predetermined time being based on the future time at which the data will be available and the time offset; and transmitting a scheduling request, SR, on a periodic SR opportunity based at least on the determined indication data.

2. The method of claim 1, wherein the indication data associated with the future transmission is associated with a packet ping at a predetermined time based on a time offset, the time offset being determined based on the future transmission.

3. The method of claim 1, wherein the indication data associated with the future transmission is associated with a trigger message transmitted to a chipset of the WD, the trigger message indicating a time that a packet will be generated.

4. The method of claim 1, wherein the method further includes:

receiving a first uplink, UL, grant based at least on the SR on the periodic SR opportunity; and transmitting at least a first UL packet and a first buffer status report, BSR, in response to receiving the first UL grant.

5. The method of claim 4, wherein the buffer status report, BSR, includes at least one of future data and non-causal data, the non-causal data being transmittable one of within the WD and to the network node.

6. The method of claim 1, wherein the method further includes:

determining generated uplink, UL, data for a transmission of at least one UL packet associated with the generated UL data, the generated UL data being generated by a WD application.

7. The method of claim 1, wherein the method further includes:

receiving a second uplink, UL, grant; and transmitting at least the second UL packet and a second buffer status report, BSR.

8. The method of claim 7, wherein at least the second UL packet and the second buffer status report, BSR, are transmitted in response at least to receiving at least any one of the second uplink, UL, grant from the network node and generated UL data from a WD application.

9. The method of claim 1, wherein method further includes:

predicting traffic associated with the future transmission based in part on input received from a WD application.

10. A method implemented in a network node configured to communicate with a wireless device, WD, the method comprising:

receiving a scheduling request, SR, on a periodic SR opportunity based at least on indication data associated with a future transmission, the SR being associated with a future time at which data for a future transmission from the WD will be available and an amount of data that will be available for the future transmission, the future transmission having a time offset that is based on at least one of: applying one or more optimization techniques or performing one or more interactions with a chipset of the WD, the indication data indicating the amount of data and a predetermined time for the future transmission, and the predetermined time being based on the future time at which the data will be available and the time offset; and determining at least one uplink, UL, grant for the WD based at least in part on the received SR.

11. The method of claim 10, wherein the indication data associated with the future transmission is associated with a packet ping associated with the WD at a predetermined time based on a time offset, the time offset being determined based on the future transmission.

12. The method of claim 10, wherein the indication data associated with the future transmission is associated with a trigger message transmitted to a chipset of the WD, the trigger message indicating a time that a packet will be generated.

13. The method of claim 10, wherein the method further includes:

transmitting a first uplink, UL, grant based at least on the SR on the periodic SR opportunity; and receiving at least a first UL packet and a first buffer status report, BSR, in response to the first UL grant.

14. The method of claim 13, wherein the buffer status report, BSR, includes at least one of future data and non-causal data.

15. The method of claim 10, wherein the method further includes:

transmitting a second uplink, UL, grant; and receiving at least the second UL packet and a second buffer status report, BSR.

16. The method of claim 15, wherein at least the second UL packet and the second buffer status report, BSR, are received in response at least to at least any one of the second uplink, UL, grant from the network node and generated UL data from a WD application.

17. The method of claim 10, wherein the generated UL data from a WD application is based at least in part on predicted traffic associated with the future transmission.

18. The method of claim 10, wherein the method further includes:

transmitting a message to WD, the message triggering a chipset of the WD to provide a time offset at which generated uplink, UL, data will be available.fset at which generated uplink, UL, data will be available.

* * * * *